Oct. 26, 1926.
H. F. MARLOW
FLYTRAP
Filed Dec. 5, 1925
1,604,460
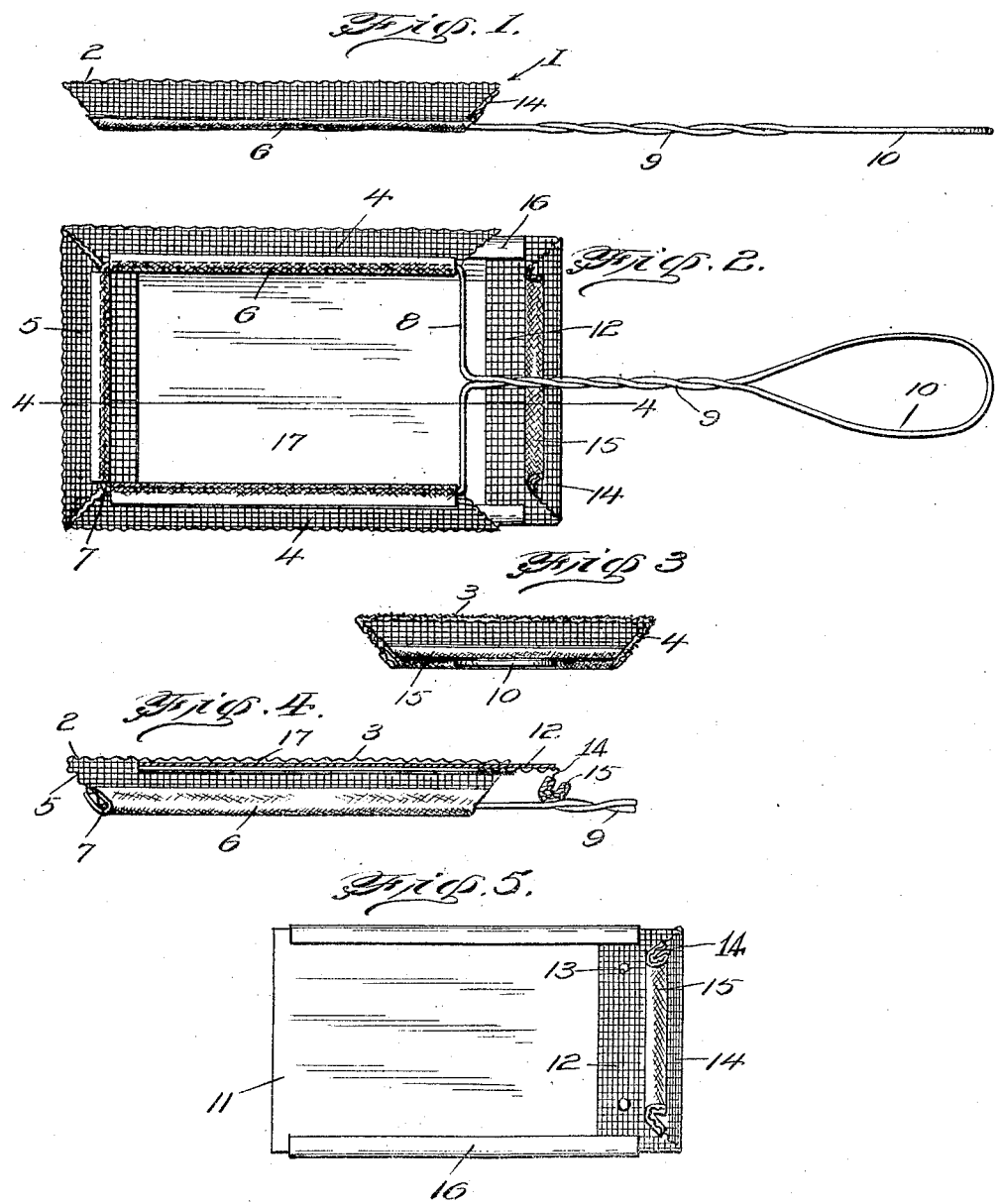
Inventor
H. F. Marlow.
By Clarence A. O'Brien
Attorney Patented Oct. 26, 1926.

1,604,460

UNITED STATES PATENT OFFICE.

HENRY F. MARLOW, OF CLEVELAND, OHIO.

FLYTRAP.

Application filed December 5, 1925. Serial No. 73,392.

This invention relates to improvements in insect exterminators, and is more particularly adapted to a fly trap wherein an adhesive covered piece of paper is employed for catching and holding the insects.

One of the important objects of the present invention is to provide a fly trap which includes a wire mesh housing having one side thereof open to permit insects to enter the same, a fly paper carrying member being removably inserted within the housing and disposed adjacent the closed side thereof for catching and holding the insects entering the housing.

A further object is to provide a fly trap of the above mentioned character wherein means is provided for holding the same in its assembled position so that the accidental displacement of the fly paper carrying member from the housing will be prevented, the parts being further so arranged as to permit said member to be readily and easily inserted or removed from the housing in a sanitary manner.

A still further object is to provide a fly trap of the above mentioned characted which is simple in construction, inexpensive, strong and durable and further well adapted to the purpose for which it is designed.

Other objects and advantages of this invention will become apparent during the course of the following description taken in connection with the accompanying drawing.

In the accompanying drawing forming a part of this application and in which like numerals designate like parts throughout the same:

Figure 1 is a side elevation of the fly trap embodying my invention.

Figure 2 is a bottom plan view thereof showing the fly paper carrying member in the act of being inserted within the housing.

Figure 3 is an end elevation of the housing and the handle associated therewith.

Figure 4 is a longitudinal sectional view taken approximately on line 4—4 of Figure 2, and Figure 5 is a bottom plan view of the fly paper carrying member.

In the drawing, wherein for the purpose of illustration is shown the preferred embodiment of my invention, the numeral 1 designates generally my improved fly trap, the same comprising a wire mesh housing 2. This housing includes a top 3, the depending longitudinal sides 4 and a depending end portion 5. The depending sides and the end portion 5 are disposed in converging relation as clearly illustrated in the several figures of the drawing.

The lower free edges of the depending sides 4 are bent back upon the outer side faces thereof as is also the lower free edge of the end portion 5, and the upturned lower edges of the depending sides and end portion of the housing are covered with cloth indicated at 6. The strips of cloth which enclose the lower edges of the depending sides and end portion of the housing are secured thereto in any suitable manner. The upturned edges of the side portions and the end portions cooperate to provide a means for retaining a substantially rectangular wire frame 7, the longitudinal sides of the frame being disposed beneath the upturned edges of the depending sides of the wire mesh housing while the forward end of the frame is disposed beneath the upturned lower edge of the depending portion 5.

The rear end portion 8 of the wire frame 7 has extending therefrom in a rearward direction, the twisted portion 9, the outer end of which terminates in the loop 10, and thereby forming a suitable handle for the fly trap. It is of course understood that the wire frame and the handle portion are formed of a single strand of wire. Of course, in this manner, the housing will be open at its bottom as well as its rear end, and the purpose of this construction will be readily apparent from the following description.

Adapted for slidable movement within the housing 2 through the open rear end thereof is a rectangular shaped piece of cardboard 11 which is slightly less in width than the width of the top 3 of the housing, and is also of a lesser length than the length thereof. A piece of wire mesh material indicated at 12 has its forward end attached to the rear end portion of the card board 11 as at 13. The rear portion of the piece of wire mesh extends beyond the rear end of the piece of card board and is provided with the depending portion 14, the lower edge of which is also bent back upon the outer side thereof, and being covered with a piece of cloth 15 in a manner similar to which the upturned lower edges of the side and end portions 5 of the housing 2 are covered with the cloth strips 6. The depending portion 14 also is inclined inwardly, and the ends thereof are cut away at an angle for cooperation with the cut away rear ends of the depending sides 4. The upturned lower edge of the depending portion 14 is also adapted for engagement with the rear end portion 8 of the rectangular wire frame 7 for holding the card board member 11 in position within the housing, it being understood of course that the upper face of the card board will engage the under side of the top 3 of the housing 2.

For the purpose of receiving and supporting a strip of fly paper of any conventional structure on the bottom face of the card board 11 there is provided at the sides of the piece of card board the inwardly disposed fly paper retaining strips 16.

In assembling the fly trap for use, a piece of fly paper is attached to the bottom face of the card board 11 and is held in position thereon through the medium of the clip 16. The card board and the fly paper secured thereon is then inserted into the housing through the open rear end thereof and is slid forwardly along the under side of the top 3 of the housing 2 in the manner as clearly illustrated in Figure 4, and when the forward end of the fly paper carrying member abuts the forward end 5 of the housing 2, the fly paper 17 will then be disposed directly over the open bottom of the frame and housing and for the purpose of securing the fly paper carrying member within the housing against accidental displacement therefrom, the upturned lower edge of the depending portion 14 of the strip 12 is sprung over the rear end 8 of the frame, and thereby the depending portion 14 forms a closure for the open rear end of the housing.

The fly trap is then ready for use, and is handled in the same manner as an ordinary fly swatter. By swinging the housing over the insects to be caught and exterminated, the insects will enter the housing through the open bottom and will come directly in contact with the adhesive space of the fly paper, and will at once be caught and held thereon. The cloth strips which are secured to the upturned edges of the depending sides and ends of the housing will prevent the wire mesh material comprising the housing from defacing or otherwise injuring the furniture or walls with which the fly trap may come in contact.

The fly paper carrying member may be readily and easily removed from the housing in order to remove the piece of fly paper from the card board carrier 11 whenever it is necessary to insert a new piece of fly paper.

If desired, the fly trap may be suspended by attaching the loop portion 10 of the handle to a suspension hook or cord and the fly trap will act in the same capacity as the suspended fly paper devices now universally used.

The simplicity of my device enables the same to be manufactured at a very low cost, and will further be strong and durable.

While I have shown the preferred embodiment of my invention, it is to be understood that minor changes in the size, shape and arrangement of parts may be resorted to without departing from the spirit or scope of the appended claims.

Having thus described the invention, what I claim as new is:—

1. A fly trap comprising a wire mesh housing open at its bottom, and at one end, a fly paper carrying member adapted for slidable movement through the open end of the housing, said member being adapted to be disposed adjacent the under side of the top of the housing whereby the adhesive surface of the fly paper is disposed directly over the open bottom of the housing, a depending strip at one end of the fly paper carrying member adapted to provide a closure for the open end of the housing when said member is entirely within the housing, and a handle associated with the housing.

2. A fly trap comprising a wire mesh housing open at its bottom, and at one end, a fly paper carrying member adapted for slidable movement through the open end of the housing, said member being adapted to be disposed adjacent the under side of the top of the housing whereby the adhesive surface of the fly paper is disposed directly over the open bottom of the housing, a depending strip at one end of the fly paper carrying member adapted to provide a closure for the open end of the housing when said member is entirely within the housing, a wire frame extending around the bottom of the housing, and means associated with the depending strip on the fly paper carrying member adapted for engagement with said frame whereby the fly paper carrying member is secured within the housing against accidental displacement therefrom, and a handle associated with the housing.

3. A fly trap comprising a wire mesh housing open at its bottom, and at one end, a fly paper carrying member adapted for slidable movement through the open end of the housing, said member being adapted to be disposed adjacent the under side of the top of the housing whereby the adhesive surface of the fly paper is disposed directly over the open bottom of the housing, a depending strip at one end of the fly paper carrying member adapted to provide a closure for the open end of the housing when said member is entirely within the housing, a wire frame extending around the bottom of the housing, and means associated with the depending strip on the fly paper carrying member adapted for engagement with said frame whereby the fly paper carrying member is secured within the housing against accidental displacement therefrom, and a handle extending rearwardly from said frame.

4. A fly trap comprising a wire mesh housing including depending sides and an end portion, said sides and the end portion of the housing being disposed in converging relation, the lower edges of the side and end-portion of the housing being bent upwardly, a substantially rectangular shaped frame extending around the bottom of the housing and in engagement with the upturned lower edges of the side portions and end portion of the housing whereby the housing is provided with an open bottom and an open end, a fly paper carrying member slidable through the open end of the housing, and adapted to be disposed adjacent the under side of the top of the housing, the adhesive surface of the fly paper disposed over the open bottom of the housing when the fly paper carrying member is arranged entirely within the housing, a depending strip associated with one end of the fly paper carrying member and adapted to provide a closure for the open end of the housing, the lower edge of the depending strip being disposed upwardly and engaging the adjacent end of the frame for preventing the accidental displacement of the fly paper carrying member from the housing, and a handle associated with the frame.

In testimony whereof I affix my signature.

HENRY F. MARLOW.